April 12, 1932. J. SACHS Re. 18,419

ELECTRIC METER SERVICE APPLIANCE

Original Filed Sept. 20, 1927 4 Sheets-Sheet 1

Inventor:
Joseph Sachs.
By S. Jay Teller
Attorney.

April 12, 1932. J. SACHS Re. 18,419

ELECTRIC METER SERVICE APPLIANCE

Original Filed Sept. 20, 1927 4 Sheets-Sheet 2

Inventor
Joseph Sachs
By S. Jay Teller
Attorney

April 12, 1932. J. SACHS Re. 18,419

ELECTRIC METER SERVICE APPLIANCE

Original Filed Sept. 20, 1927 4 Sheets-Sheet 3

49

Inventor.
Joseph Sachs.
By S. Jay Teller
Attorney.

April 12, 1932. J. SACHS Re. 18,419

ELECTRIC METER SERVICE APPLIANCE

Original Filed Sept. 20, 1927 4 Sheets-Sheet 4

Inventor.
Joseph Sachs.
By S. Jay Teller
Attorney.

Reissued Apr. 12, 1932 Re. 18,419

UNITED STATES PATENT OFFICE

JOSEPH SACHS, OF WEST HARTFORD, CONNECTICUT

ELECTRIC METER SERVICE APPLIANCE

Original No. 1,757,743, dated May 6, 1930, Serial No. 220,807, filed September 20, 1927. Application for reissue filed December 2, 1931. Serial No. 573,569.

The invention relates particularly to an electric meter service appliance which is similar to the constructions disclosed in my patents for electric circuit controlling appliances, No. 1,754,443 and No. 1,754,445 both issued April 15, 1930 and No. 1,757,741 issued May 6, 1930.

An electric meter service appliance of the type to which the invention relates is adapted to be used not only for normal service purposes but also for facilitating the testing of the meter. When the meter is to be tested the normal circuit from the service wires through the meter to the customer's load wires must be interrupted and in order that the customer may not be deprived of service during testing it is customary to provide by-pass connections from the service wires to the load wires. In my aforesaid Patent No. 1,757,741 I have disclosed test contacts or attachment devices connected to or associated with the service and load wire terminals and adapted for the connection thereto of flexible by-pass jumpers for the purpose of maintaining the customer's service during testing.

One of the general objects of the present invention is to provide by-pass attachment devices of improved form and mounted in an improved manner, these devices preferably being mounted directly on the switch contact structures and being adapted for rigidly holding or clamping inflexible links which serve as the required by-pass connections.

A meter service appliance of the type disclosed in Patent No. 1,757,741 is so constructed and connected that the normal circuit is broken before or in advance of the meter whenever the switch is opened; and in the embodiment of the invention as shown the circuit is broken both before the meter and after the meter, the meter coil terminals being thus left electrically free so that testing can be effected in any usual or desired way. For some methods of testing, however, it is necessary to maintain a connection between the service wires and the meter, and one of the objects of the present invention is to provide improved means making it possible to by-pass the switch devices which are ahead of the meter, thus electrically connecting the meter with the service wires when the normal connections of the meter with the said wires have been interrupted by the operation of the switch mechanism.

In making the electrical connections preparatory to testing a meter it is ordinarily necessary or desirable to provide a by-pass between each incoming service wire and the corresponding outgoing load wire, and, as already pointed out, it is also frequently necessary or desirable to by-pass one or more of the switch devices ahead of the meter so as to maintain a connection between one or more of the service wires and the meter. As herein disclosed by-pass link holding devices are provided for clamping or holding inflexible links, and it is one of the objects of the invention to so construct and arrange these link holding devices that similar links may be used interchangeably for providing a by-pass between a service wire and a load wire or for providing a by-pass across one of the switch devices.

A meter service appliance of the type to which the present invention relates includes a base carrying the fuse contacts and it also includes a wire terminal which is electrically connected with one of the fuse contacts on the base independently of the switch parts. The base carrying the fuse contacts may be and preferably is mounted so as to be conveniently removable from the switch parts to provide access to the latter and to permit removal of the movable switching member. It may also be desirable to construct the base so that it may be bodily reversed to change the sequence of electrical connections as set forth in my said Patent No. 1,757,741. One of the objects of the present invention is to provide a construction of this type having the fuse connected wire terminal mounted entirely independently of the base and having means whereby an electrical connection with the said terminal may be conveniently established when the base is in a normal position. In this way I facilitate reversal or removal of the base, avoiding any interference with such removal or reversal such as might occur with the fuse connected wire terminal carried by the base and connected with a wire.

Further objects of the invention will be apparent from the following specification and claims.

In the accompanying drawings I have shown an embodiment of the invention which I now deem preferable but it will be understood that the drawings are intended for illustrative purposes only and are not to be construed as defining or limiting the scope of the invention, the claims forming a part of this specification being relied upon for that purpose.

Figure 1:
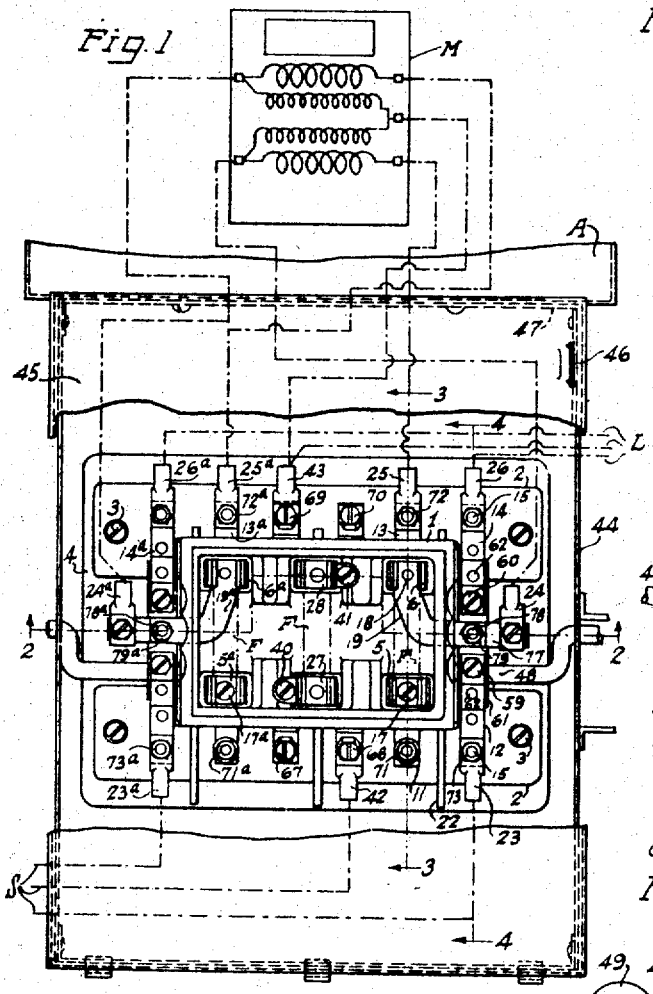
Fig. 1 is a front view of an appliance embodying the invention, a portion of the front cover of the appliance being broken away to show interior parts.
Figure 5:
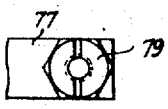
Fig. 5 is an enlarged fragmentary front view showing a detail.
Figure 6:
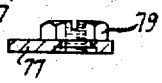
Fig. 6 is a central sectional view of the parts shown in Fig. 5.

An appliance embodying the invention preferably includes a fused switch unit and a casing or cabinet for enclosing the said unit. In Figs. 1 to 12 of the drawings I have shown a fused switch unit having three poles and adapted for use with a polyphase circuit, and in Figs. 13 to 15 I have shown a fused switch having two poles and adapted for use with a single-phase three wire circuit. It will be understood that the parts constituting the fuses and switch devices at the respective sides of the unit, whether a three pole unit or a two pole unit, are or may be similar in construction except for reversal of positions. For the sake of brevity I will confine the description so far as possible to the parts at one side.

As illustrated in Figs. 1 to 12 the fused switch unit of the appliance includes an insulating base 1 mounted in fixed spaced relationship with a rear supporting wall which may be the rear wall of the enclosing cabinet. Preferably the fused switch unit also includes a second insulating means which serves as a supporting device and is secured directly to the said supporting wall. This insulating means may comprise two separate bars or members 2, 2 spaced apart and secured to the rear wall of the cabinet by suitable means such as screws 3, 3. If necessary a sheet 4 of insulating material may be interposed between the members 2, 2 and the supporting wall. The several conducting parts of the fused switch unit are connected with the said insulating members 1 and 2, 2.

The fuse contacts are represented at 5 and 6, these being carried directly by the base 1 ordinarily at the front thereof. I have shown contacts for receiving a fuse F of the cartridge enclosed type, but I do not necessarily so limit myself. Located in normally fixed relationship to the fuse contacts and preferably at least in part in the space behind the plane of the rear face of the base 1 are one or more switch devices which may be variously constructed as concerns certain of the broader phases of the invention. Preferably, but not necessarily, each of these switch devices comprises two opposed stationary switch contacts and a rectilinearly movable switching member which includes a contact adapted to engage or disengage both of the stationary contacts to make or break the electrical connections beween them. The preferred construction as shown is similar to the constructions disclosed in my said patents.

The opposed stationary contacts for one switch device are represented at 7 and 8 and when a second switch device is provided the stationary contacts thereof are constructed and located as indicated at 9 and 10. The several stationary switch contacts are parts of contact structures which also include supporting elements 11, 12, 13 and 14 which project forward from the supporting devices 2, 2 and which may be secured thereto by screws 15, 15. Each of the switch contacts proper, 7, 8, 9 and 10, is preferably of a general U-shape and is provided with a laterally extending flange engaging the corresponding supporting element. Screws or rivets 16, 16 extend through the flanges and into the supporting elements to hold the contacts in place.

When there are two switch devices as shown and described I provide means whereby electrical connection may be made between one fuse contact and one switch contact structure of one pair. To this end the supporting element 11 is extended upward to a position directly back of the fuse contact 5 and a screw 17 extends through the fuse contact and through the base 1 into the said supporting element 11. Thus the screw 17 serves to establish an electrical connection between the said fuse contact and the supporting element 11 which in turn is electrically connected with the switch contact 7 as already described, and at the same time the screw 17 serves to hold the fuse contact 5 in place on the base. In addition the said screw and the supporting element 11 serve as one of the means for holding the base in normally fixed relationship with the supporting device 2, 2.

The remaining fuse contact 6 is held in place on the base 1 by a screw 18 which also retains a conducting member 19 engaging the said contact. The said member 19 extends from the fuse contact to a point adjacent or beyond one edge of the base. Preferably the said member 19 is in the form of a strap which extends downward and laterally from the fuse contact terminating near one side of the base.

For making and breaking electrical connection between the stationary switch contacts of each pair there is provided a rectilinearly movable switch contact preferably carried by a flat insulating element as described in detail in my aforesaid Patent No. 1,754,443. When there are two switch devices there are two movable contacts carried by a single insulating element. The two movable switch contacts are shown at 20 and 21 respectively and the flat insulating element is shown at 22, the said insulating element with the movable switch contacts thereon constituting a switching member. The switching member is guided at the front by the base 1 and at the rear by the supporting device 2, 2. It will be understood that when the switching member is moved the two contacts 20 and 21 are moved to simultaneously engage and disengage the respective pairs of switch contacts 7 and 8, and 9 and 10 and thus make and break the electrical connection through the switching devices. It will be further understood that to break the circuit the switching members are moved in the upward direction from the positions shown in Figs. 1 to 8 to the positions shown in Figs. 9 and 10.

Connected respectively with the supporting element 12, with the end of the strap 19 and with the supporting elements 13 and 14 are wire connecting terminals 23, 24, 25 and 26. It will be obvious that the said terminals 23, 24, 25 and 26 are electrically connected respectively with the switch contact 8, the fuse contact 6, the switch contact 9 and the switch contact 10.

The description thus far has been chiefly confined to the fuse and switch parts at the right hand side of the fused switch unit. The parts at the left hand side are ordinarily similar except for reversal of positions and repetition of the detailed description is unnecessary. The fuse contacts are designated by $5^a$ and $6^a$, and the wire terminals corresponding to the terminals 23, 24, 25 and 26 are designated respectively by $23^a$, $24^a$, $25^a$ and $26^a$. Other parts at the left are similarly marked.

For a three pole unit as illustrated a third central pair of fuse contacts 27 and 28 is provided on the base 1. A third set of switch parts is also provided similar to those already described. The switch contacts are shown at 29, 30, 31 and 32 and the supporting elements therefor are shown at 33, 34, 35 and 36, the said supporting elements being secured to the insulating supporting devices in the same manner as the other supporting elements already described. The supporting elements 33 and 36 are provided with brackets 33′ and 36′ which engage the base 1. The third movable switching member comprises contacts 37 and 38 and an insulating element 39.

The fuse contacts 27 and 28 are mechanically connected to the base 1 and electrically connected with the brackets 33′ and 36′ on the supporting elements 33 and 36 respectively by means of screws 40 and 41. It will be observed that these screws assist in holding the base 1 in its normal fixed relationship with the supporting device 2, 2. The supporting elements 34 and 35 are provided respectively with wire terminals 42 and 43. Thus when the switching member is in the "on" position an electrical connection is established between the terminals 42 and 43 and through a fuse carried by the contacts 27 and 28.

The fused switch device is preferably mounted in a suitable casing or cabinet such as the cabinet 44 shown in the drawings. The cabinet 44 is shown as being provided with a pivoted front cover 45 which is hinged to one wall as for instance the bottom end wall, so as to be openable to permit access to the switch and fuse parts. The cover may be locked in closed position by means of a latch 46 and if desired a seal may be inserted through the latch in the usual way to definitely prevent the opening of the cabinet except by breaking the seal. Suitable provision is made for the protective association of the cabinet with an electric meter. For a polyphase meter such as indicated diagrammatically at M, there may be provided an adapter A connected or adapted to be connected with the upper end wall 47 of the cabinet. The said end wall has an opening therein for receiving the wires extending between the meter and the appliance in the cabinet. Thus the cabinet serves in conjunction with the adapter as a means not only for protectively enclosing the switch and fuse parts but for also protectively enclosing the connections between the switch and fuse parts and the meter. The end wall and adapter construction is not shown in detail as it does not of itself constitute a part of the present invention.

I provide a suitable means for operating the three switching members, this means being accessible at all times even though the switch devices are enclosed as preferred and as described. I have shown this operating means as comprising a spindle 48 which extends through bearing apertures in the side walls of the cabinet and which is provided with an operating handle 49 on the exterior of the cabinet. Within the cabinet the operating spindle 48 is provided with a cranked portion which extends through a slot 50 formed in the insulating element of each movable switching member. When there are three such switching members as shown, the one operating spindle 48 serves to operate all of them so as to make and break the respective circuit connections substantially simultaneously.

Figure 9:
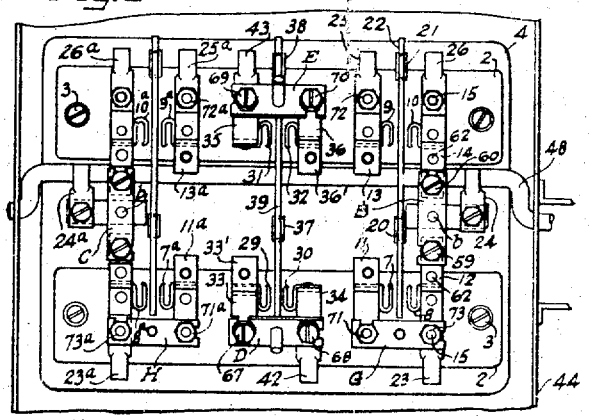
Fig. 9 is a fragmentary front view similar to Fig. 7, but showing the switch members in their "off" positions and also showing in place certain links used for meter testing.
Figure 10:
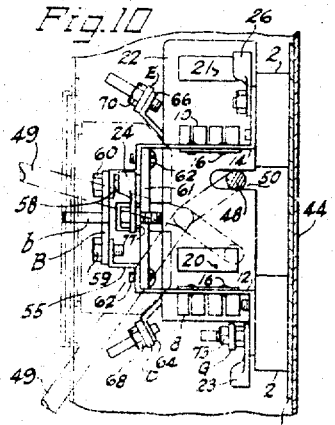
Fig. 10 is a side view of the parts shown in Fig. 9.

An appliance embodying the invention is particularly adapted, when associated with a meter as shown, to provide an electrical sequence of service wire—switch—meter—fuse—switch—load wire or an electrical sequence of service wire—switch—fuse—meter—switch—load wire, all as fully described in my said Patent No. 1,757,741. In Fig. 1 I have designated by dot-and-dash lines one arrangement of wiring connections which may be provided. The three service wires designated S are connected respectively with the terminals 23, 42 and $23^a$. One coil of the meter is connected between the terminals 24 and 25 and the other coil of the meter is connected between the terminals $24^a$ and $25^a$ and a third connection to the meter is made from the terminal 43. The load wires L are connected respectively with the terminals 26, 43 and $26^a$. It will be observed that with this arrangement of connections I provide an electrical sequence of service wire—switch—fuse—meter—switch—load wire. By making other connections as will presently appear I may provide an electrical sequence of service wire—switch—meter—fuse—switch—load wire. With the switching members in their "on" positions as shown in Figs. 1 to 8 the meter is connected in the circuit as above described. When the switching members are moved to their "off" positions as shown in Figs. 9 and 10 the circuit is broken at both sides of the meter which is thus disconnected from both service and load wires.

The cover 45 of the cabinet is preferably provided with an opening through which the fuse contacts and the fuses are accessible when the cover is closed, the cover nevertheless keeping the switching devices and other parts inaccessible. The opening in the cover is shown at 51, the base 1 being so formed and positioned as to substantially close the opening when the cover is closed. As shown the base 1 has a barrier at the front which entirely surrounds the fuse contacts and the fuses and which extends forward to close the said opening 51. This barrier has an open-sided recess therein through which the aforesaid strap 19 extends. As a result of the construction as described it is substantially impossible for all practical purposes to obtain access to any of the live conducting parts within the cabinet, except the fuse contacts and the fuses, after the cover has been closed and sealed.

Preferably an auxiliary cover is provided normally closing the opening 51 in the cover 45 and protecting the fuses. With the fuses connected ahead of the meter as illustrated in Fig. 1 it is preferably to provide a cover which positively prevents access to the said fuses except when the switches are open. Accordingly I have shown a transversely slidable fuse cover 52 which is held and guided by means of a member 53. The cover 52 is provided with a knob 54 by means of which it may be moved laterally. With the parts in the positions shown the cover 52 is obstructed by the handle 49 so that the cover cannot be opened to expose the fuses so long as the handle 49 remains in the switch closing position. However, when the handle is moved downward so as to move the several switching members upward to open the circuit the cover is then free to be moved laterally toward the right to permit access to the fuse contacts and the fuses; but with the cover thus moved laterally it is impossible to move the handle 49 upward to close the circuit. The interlocked cover and handle construction as disclosed does not of itself constitute any part of the present invention, being set forth in my patents for enclosed fused switches, No. 1,721,493, No. 1,721,494 and No. 1,721,495 all issued July 16, 1929.

In accordance with the present invention I provide improved by-pass means for directly connecting the respective service wires with the corresponding load wires independently of the switch contacts and independently of the meter. As shown the respective service and load terminals at the two sides of the appliance are so arranged as to be substantially in vertical alignment with each other, that is, the terminal 23 is in alignment with the terminal 26 and the terminal $23^a$ is in alignment with the terminal $26^a$. I further provide in association with the said service and load terminals devices or contacts adapted for the convenient attachment or holding of by-pass links. As shown the contacts or holding devices are such as to permit the attachment or complete removal of the links, but as to this detail I do not necessarily limit myself.

Referring particularly to the construction at the right hand side it will be observed that the two switch contact structures which respectively include the supporting elements 12 and 14 are provided respectively with forward extensions 55 and 56. These extensions terminate in flanges 57 and 58 which extend respectively upward and downward toward each other and in alignment with each other. These flanges 57 and 58 are provided with means adapted for the clamping or holding of a conducting by-pass link and as shown these clamping or holding means consist of cap screws 59 and 60 threaded into the respective flanges.

In Figs. 9 and 10 I have shown the switching members in their "off" positions and I have shown two links B and C secured respectively to the clamping means or connecting elements at the two sides of the appliance. In these views the fuse base is omitted solely for the sake of clearness, but it will be understood that the said base is not to be removed when the by-pass links are in use. Each of the links B and C is provided with two slots for receiving the corresponding screws 59 and 60, the screws being then turned to firmly clamp the link in place. Each of the links preferably has a handle *b* of insulating material by means of which it may be conveniently put in place or removed. It will be seen that with the links B and C in place the service terminals 23 and 23ª are directly connected respectively with the load terminals 26 and 26ª.

Preferably the two extensions 55 and 56 are mechanically connected together by an insulating means such as a strut 61. As clearly shown in Figs. 4 and 10 the said extensions 55 and 56 are provided with offset portions with which the strut 61 engages, the said strut being held in place by means of screws 62, 62. The struts 61 serve to reinforce the extensions on the supporting elements and have other functions as will presently appear.

When a third set of fuse and switch parts is provided as illustrated and described I provide in accordance with the invention means for also by-passing the switch parts of this third leg of the circuit. To this end I provide two pairs of contacts or link holding devices connected respectively with switch contacts. As shown the contacts or holding devices are such as to permit the attachment or complete removal of the links, but as to this detail I do not necessarily limit myself. As clearly shown in Figs. 7 and 8 the two supporting elements 33 and 34 are provided respectively with downward extensions 63 and 64 and the two supporting elements 35 and 36 are provided with upward extensions 65 and 66. The extensions 63 and 64 are provided with screws 67 and 68 similar to the screws 59 and 60 and similarly adapted to engage a by-pass link D as shown in Figs. 9 and 10. Similarly the extensions 65 and 66 are provided with screws 69 and 70 adapted to receive a by-pass link E.

It will be observed that with all four of the by-pass links B, C, D and E in place as shown in Figs. 9 and 10 the movable switching members may be moved to the "off" position to open the normal circuit without, however, interfering with the supply of current to the load wires. With the switch members in their "off" positions the circuit is broken at both sides of the meter and the terminals of the meter coils are entirely freed from both the service and the load wires. The meter is then ready for testing in any usual or preferred way. When the several links are completely detachable as shown the links D and E are preferably of the same dimensions as the links B and C so that all of the links may be used interchangeably.

In order to facilitate the connection of instrument leads for the testing of the meter I provide suitable test contacts. The test contacts may be variously constructed but as illustrated in Figs. 1 to 10 I use for this purpose certain of the aforesaid screws 15 which hold the switch contact supporting elements in place. Screws connected respectively with the contacts 7, 7ª and 9, 9ª are made longer than would otherwise be necessary and they are provided respectively with additional nuts 71, 71ª and 72, 72ª. These nuts serve for clamping the terminals of testing instrument leads which may thus be electrically connected with the respective meter terminals. It will be observed that the arrangement is such that the fuses are in the meter testing circuit.

For some methods of meter testing it is necessary to have the meter coils in electrical connection with the service wires but out of electrical connection with the load wires. In accordance with the present invention I provide means for establishing electrical connections between the service wires and the meter notwithstanding the fact that the switching members are in their "off" positions to break the normal connection between the service wires and the meter. To this end I provide means associated respectively with the switch contacts 7, 8 and 7ª, 8ª at the service side of the meter whereby the said contacts may be respectively by-passed when the switching member is in its "off" position. The said means comprises suitable contacts or holding devices for by-pass links. As shown the holding devices are such as to permit the attachment or the complete removal of the links, but as to this detail I do not necessarily limit myself. As shown the contacts or holding devices include the aforesaid nuts 71, 71ª and other similar nuts 73, 73ª on screws connected with the service wire connectible contacts 8 and 8ª. The screws carrying the said nuts 71, 71ª and 73, 73ª are adapted respectively to receive links G and H as shown in Figs. 9 and 10, the said links being clamped in place by the said nuts. The contacts 7 and 7ª are at all times in connection with the respective meter coils through the corresponding fuses, and thus when the links G and H are in place the said meter coils are electrically connected respectively with the terminals 23 and 23ª and therefore with the corresponding service wires. The links G and H are preferably of the same dimensions as the links B, C, D, and E so that all of the links may be used interchangeably.

It will be observed that the links G and H can be put in place only when the movable switching members are in their "off" positions and that after the links are in place they interfere with the switching members to prevent their movement to their "on" positions. Thus it is impossible for the meter tester to inadvertently leave the by-pass links G and H in place at the conclusion of testing. This feature is desirable but not essential.

Preferably the base 1 is so mounted in relation to the other parts that it is bodily removable for the purpose of providing access to the switch parts and for the purpose of permitting removal of the switching members as set forth in my said Patent No. 1,754,445. In order to remove the base 1 the four screws 17, 17ª, 40 and 41 are disengaged from the corresponding supporting elements 11, 11ª, 33 and 36. Preferably in order that the several screws and the corresponding fuse contacts may remain connected with the base when the base is detached from the other parts each of the said screws is provided with a washer 74 which fits an annular groove therein. The washer 74 is located in a recess 75 in the base. The washer permits the screw to move forward far enough to disengage the corresponding connecting element but nevertheless prevents the screw and corresponding fuse contact from being removed.

It will be observed that the struts 61 serve as means independent of the rear supporting wall for connecting the upper and lower parts of the switch mechanism when the said parts are not connected by the base 1. The struts make it possible for the manufacturer to assemble as a single unit the two supporting devices 2, 2 with all of the contacts and terminals directly carried thereby. This assembly may be entirely independent of the base and entirely independent of the enclosing cabinet.

Figure 11:
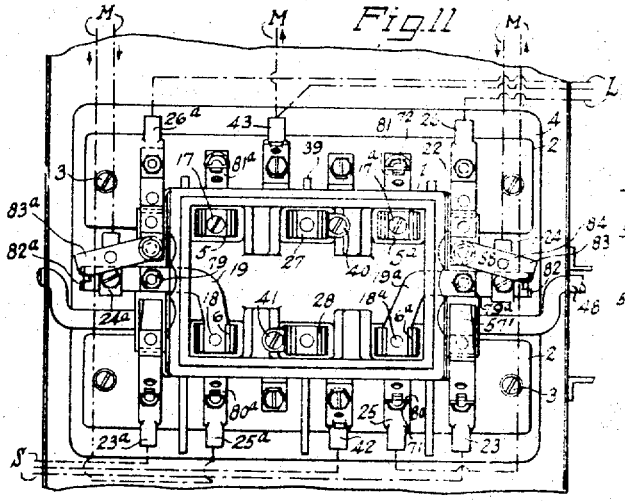
Fig. 11 is a fragmentary front view similar to Fig. 1 but showing the fuse carrying base in reversed position, and also showing an alternate construction for the testing and by-pass devices.
Figure 12:
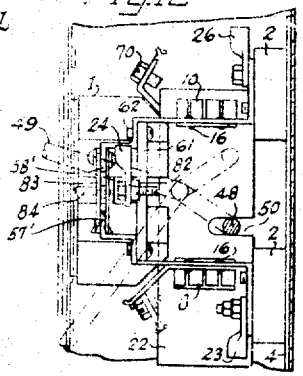
Fig. 12 is a side view of the parts shown in Fig. 11.

In Fig. 1 I have shown electrical connections providing a sequence of service wire—switch—fuse — meter — switch — load wire. As already stated it is possible by making other connections to provide an electrical sequence of service wire — switch — meter — fuse—switch—load wire. In order that either electrical sequence may be conveniently obtained without the necessity for changing the positions of the service and load wire connections the base 1 together with the parts carried thereby is constructed so as to be easily reversible as set forth and claimed in my aforesaid Patent No. 1,757,714. The base may be reversed with respect to the switch parts or the entire fused switch unit (except the movable switching members) may be reversed with respect to the enclosing cabinet. I have shown the base as reversible with respect to the switch parts. After the base has been removed as already described it can be reversed and again put in place as shown in Figs. 11 and 12 the said screws 17, 17ª, 40 and 41 being then engaged respectively with the supporting elements 13ª, 13, 36 and 33. The supporting elements 13ª and 13 are provided with the necessary threaded holes to receive the said screws 17 and 17ª.

With the base 1 in the reversed position shown in Figs. 11 and 12 the positions of the wire terminals 25, 25ª are changed, the said terminals being placed at the bottom and connected with the switch contacts 7, 7ª instead of at the top and connected with the switch contacts 9, 9ª. With the parts thus arranged the service wires S are connected as before with the terminals 23, 42 and 23ª. One coil of the meter is connected between the terminals 25 and 24 and the other coil of the meter is connected between the terminals 25ª and 24ª and a third connection to the meter is made from the terminal 43. The load wires are connected as before with the terminals 26, 43 and 26ª. It will be observed that with this construction I provide an electrical sequence of service wire—switch—meter—fuse—switch—load wire without changing the positions of the service and load wire connections. This arrangement differs essentially from that shown in the other figures in that the fuse is connected after the meter instead of ahead of the meter. With the base reversed as shown the several by-pass links B, C, D, E, G and H are connected exactly as already described when the meter is to be tested.

Figure 3:
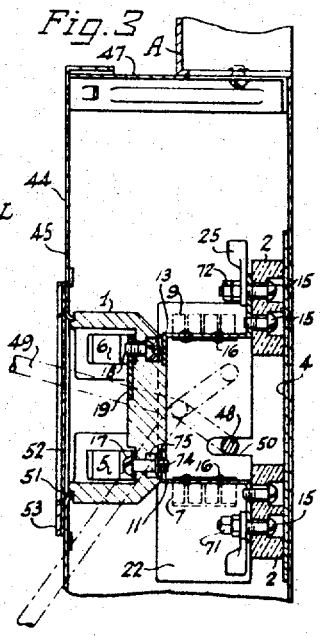
Fig. 3 is a vertical sectional view taken along the line 3—3 of Fig. 1.
Figure 4:
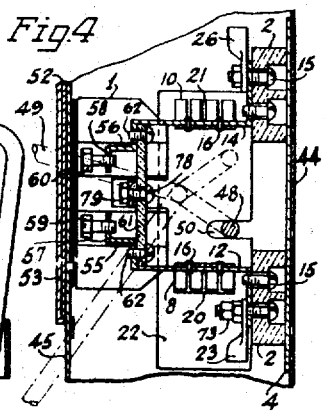
Fig. 4 is a vertical sectional view taken along the line 4—4 of Fig. 1.
Figure 2:
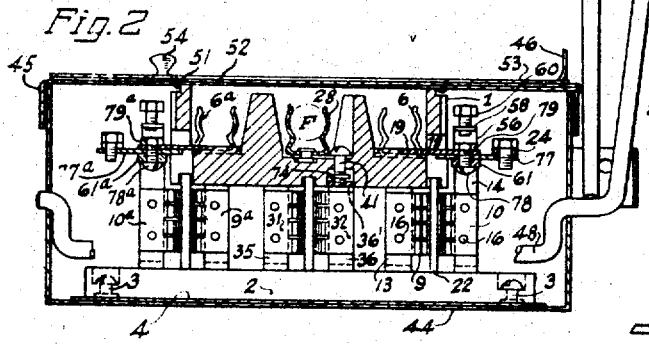
Fig. 2 is a transverse sectional view taken along the line 2—2 of Fig. 1.
Figure 7:
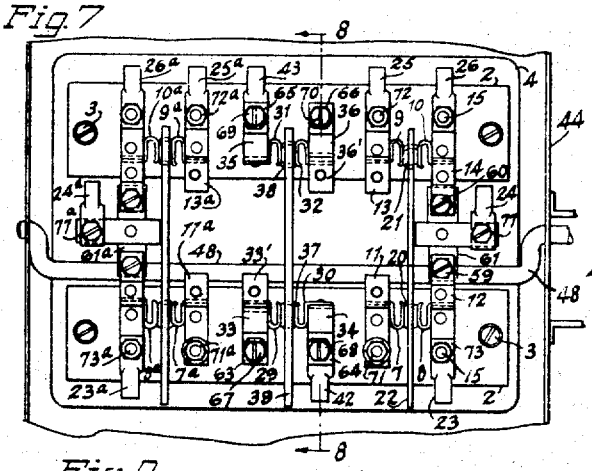
Fig. 7 is a fragmentary front view similar to Fig. 1 but with the fuse carrying base removed.
Figure 8:
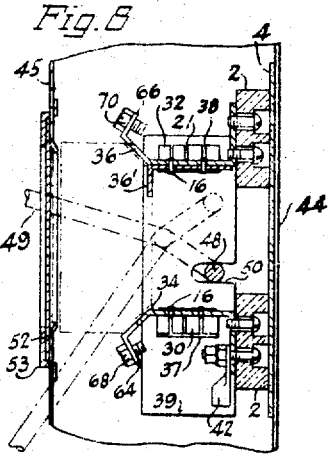
Fig. 8 is a vertical sectional view taken along the line 8—8 of Fig. 7.

With the fuse connected after the meter it may be desirable to omit the interlocked cover and switch handle construction as shown in Figs. 1 to 3 and already described. In lieu of this construction there may be provided a simple hinged cover for the opening 51 in the main cover. This alternate cover construction is not shown as it constitutes no part of the present invention and is fully disclosed in the said Patent No. 1,757,741.

The wire terminal 24 has been described as electrically connected with the strap 19. The said terminal may, however, have an independent mechanical mounting. The strap 19 has been described as extending to one edge of the base and when it extends to a side edge as shown the corresponding insulating strut 61 may be utilized as the means for mechanically supporting the corresponding terminal 24. As illustrated particularly in Figs. 1 and 2 I provide a short transverse strap 77 which carries the terminal 24 and which is secured to the strut 61 by means of a screw 78. This screw extends forward through the strut and is threaded into the strap 77. The inner end of the strap 77 extends into a recess in the base 1 and is thus held from turning about the axis of the screw 78. In order to make electrical connection between the strap 19 and the strap 77 the said strap 19 is provided with an opening positioned to receive the projecting end of the screw 78. The strap 19 carries a nut 79 which is rotatably secured thereto as shown in detail in Figs. 5 and 6. This nut is adapted to be threaded onto the end of the screw 78 as shown in Fig. 2. This construction assists in holding the base in place, and it will be understood that the nuts 79 and 79ª at the two sides must be freed from the corresponding screws 78 when the base is to be removed. By reason of the construction described I am able to effect the removal of the base and of the parts carried thereby without disturbing the terminals 24 and 24ª or the wires connected thereto.

When the base is adapted to be reversed as already described the parts are so arranged that the projecting ends of the two straps 19 and 19ª are centrally positioned vertically in order that the holes in the said straps will register with the screws 78 with the base 1 and the straps in either of their relatively reversed positions. The central location of the ends of the straps 19 and 19ª further enables them to pass between the connection elements 57 and 58 with the base in either of its relatively reversed positions.

In Figs. 11 and 12 I have not only shown the fuse base and attached part in reversed positions but I have also shown an alternate test contact construction. As shown I have provided auxiliary contacts 80, 81, 80ª and 81ª connected respectively with the switch contacts 7, 9, 7ª and 9ª. The instrument leads may be connected directly to the said contacts 80, 81, 80ª and 81ª instead of being clamped by the nuts 71, 72, 71ª and 72ª as already described. The said nuts however are preferably retained for holding the links G and H when necessary. Additional contacts 82 and 82ª may be provided in connection with the terminals 24 and 24ª. If desired other similar test contacts may be provided in connection with the switch contacts 30, 31, 8, 10, 8ª, and 10ª.

In Figs. 11 and 12 in addition to the alternate test contact construction I have shown an alternate by-pass link construction. Instead of detachable links such as B and C I have shown links 83 and 83ª permanently attached and forming switch blades. In Fig. 11 the blades are shown in their normal open positions and in Fig. 12 the blade 83 is shown in the closed position which it occupies during testing. As illustrated the extension 58′ constitutes a hinge contact to which the link or blade 83 is connected by means of a pivot element 84. The extension 57′ constitutes a rupture contact adapted to be engaged and disengaged by the link or blade 83. The said link or blade 83 is provided with an insulating handle 84 by means of which it may be moved. It will be understood that normally the blade 83 is disengaged from the contact 57′ but that it can be engaged when it is desired to directly connect the service and load wire connectible terminals as already described.

Figure 13:
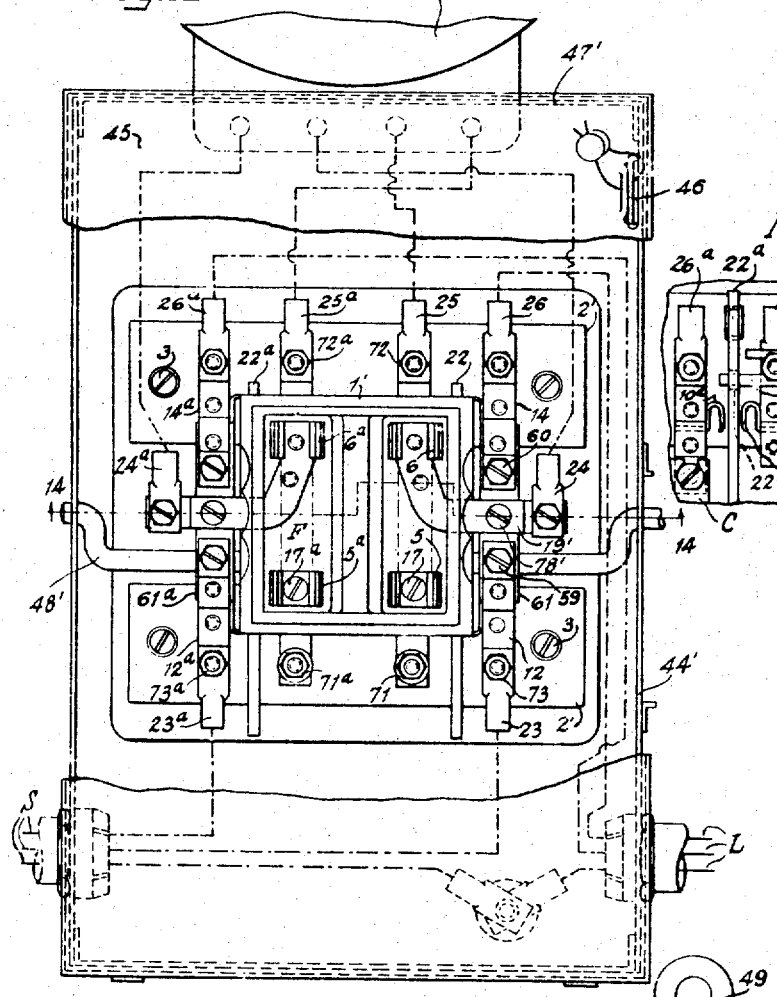
Fig. 13 is a view similar to Fig. 1 but on a larger scale and showing an alternate embodiment of the invention.
Figure 15:
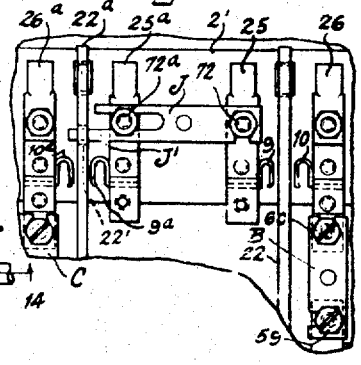
Fig. 15 is a fragmentary view similar to Fig. 13 but with the fuse carrying base removed, this view also showing in place a connecting link used for testing.
Figure 14:
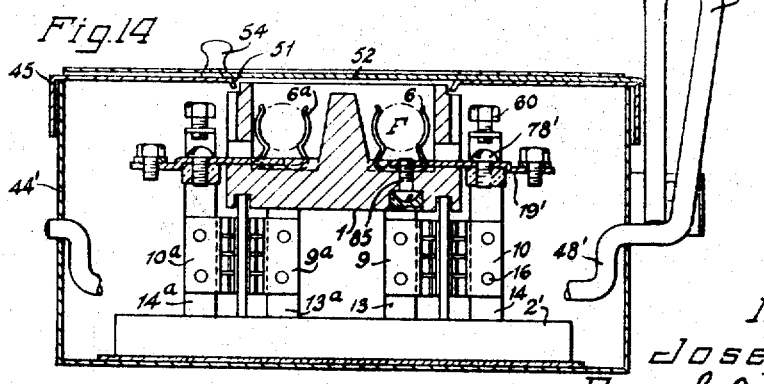
Fig. 14 is a fragmentary sectional view taken along the line 14—14 of Fig. 13.

In Figs. 13 to 15 I have shown a fused switch appliance having two poles and adapted for use with a single phase three-wire circuit. The various parts are or may be similar to those already described except for the omission of the central fuse and switch parts. If desired the transverse dimensions of the supporting device 2′, 2′ of the operating spindle 48′ and of the cabinet 44′ may be reduced to avoid excessive spacing. With a single phase meter such as M′ the upper end wall 47′ of the cabinet preferably has an opening therein of such size and shape as to substantially fit the terminal chamber portion of the meter, the said terminal chamber portion projecting for a short distance into the cabinet and substantially closing the said opening. Inasmuch as the details of the switch and fuse parts may be the same as already described, the same reference characters are applied to them thus avoiding the necessity for any repetition of description.

I have shown wiring connections providing an electrical sequence of service wire—switch—fuse—meter—switch—load wire and it will be understood that with these connections it is necessary or at least highly preferable to provide an interlocked cover construction as shown in Figs. 1 to 3. It will be understood that the base 1′ and the parts carried thereby may be reversed in position as already fully described in connection with Figs. 1 to 12; or that, if preferred, the entire fused switch unit (except the movable switching members) may be reversed with respect to the enclosing cabinet. This reversal, whether effected in one way or the other, provides an electrical sequence of service wire—switch—meter—fuse—switch—load wire without changing the positions of the service wire and load wire connections. With the electrical sequence last above set forth the interlocked cover construction may be omitted if desired and an auxiliary cover can be provided which is capable of being opened at any time as desired.

It will be understood that for testing the meter the several links B, C, G and H may be used exactly as already described in connection with Figs. 1 to 10.

While there are certain advantages in providing an independent mechanical mounting for each of the terminals 24 and 24ª as described in connection with Figs. 1 to 12, this independent mechanical mounting may nevertheless be dispensed with and the said terminals may be mounted directly on the conducting straps which connect with the respective fuse contacts. In Figs. 13 and 14 I have shown an alternate construction in which there is provided at each side a conducting strap 19′ similar to the strap 19 but extended far enough to the side to permit the corresponding wire terminal 24 to be connected directly to it. An additional screw 85 may be provided for more firmly holding the strap 19′ in place. Preferably the strap 19′ is connected with the corresponding strut 61 by means of a screw 78′. It will be understood that in removing the base for the purpose of providing access to the switch parts or for the purpose of reversal the two screws 78′ must be removed as well as the screws 17 and 17ª. It will be further understood that upon reversal the positions of the terminals 24, 24ª should be changed with respect to their supporting straps in order that they may be in the positions most convenient for the connection of the wires.

Figure 16:
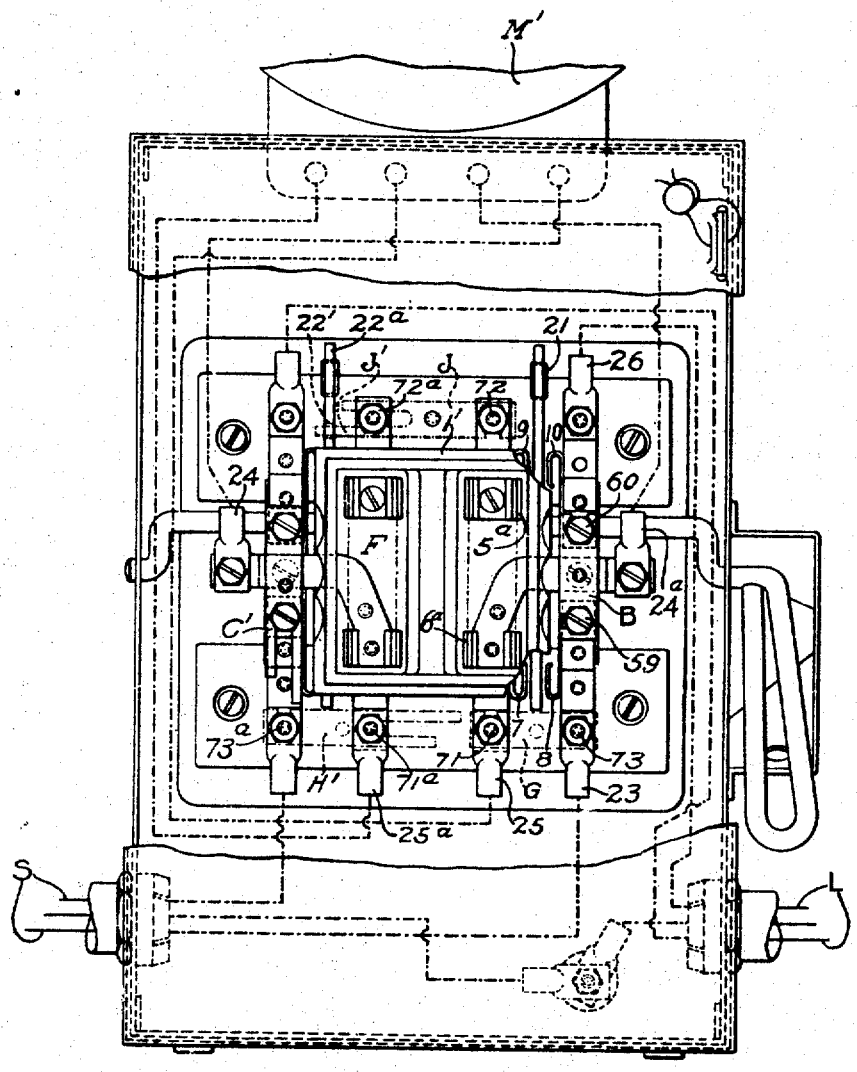
Fig. 16 is a view similar to Fig. 13, but showing the fuse carrying base in reversed position and also showing the wire terminals differently arranged.

In Fig. 16 I have shown the fuse base 1′ in a position reversed with respect to the position shown in Fig. 13 and the wire terminals 25 and 25ª have been located at the bottom and connected respectively with the switch contacts 7 and 7ª. The switch mechanism is shown in its open-circuit position. When the parts are arranged as shown, the switch contacts 7 and 8 constitute a pair of spaced electrical contacts in the circuit ahead of the meter, the fuse contacts 5ª and 6ª constitute a pair of spaced electrical contacts in the circuit after the meter, and the switch contacts 9 and 10 constitute a second pair of spaced electrical contacts in the circuit after the meter. With this arrangement the wire terminals 23 and 25 constitute a pair of such terminals electrically connected respectively with the two switch contacts 8 and 7 and adapted respectively for the connection of a service wire and of a wire leading to the meter. The wire terminals 24 and 26 constitute a second pair of such terminals normally electrically so connected that the spaced contacts 5ª, 6ª and 9, 10 are between them, and these terminals are adapted respectively for the connection of a wire leading from the meter and of a load wire. The terminals 24ª and 26 may be regarded as normally electrically connected with the fuse contacts 6ª and 5ª, but it will be understood that in the particular construction shown the electrical connection of the terminal 26 is through the additional switch contacts 9 and 10 and the movable connector 21.

The link holding devices at 73 and 71 constitute a pair of such devices electrically connected respectively with the service wire terminal 23 and with the meter wire connectible terminal 25. The link holding devices at 59 and 60 constitute a pair of such devices electrically connected respectively with the said service wire terminal 23 and with the load wire terminal 26. As already stated the holding devices are adapted for holding rigid by-pass links and the devices of the two pairs are similarly constructed and similarly spaced so that the same or similar by-pass links may be interchangeably held by them. The holding devices of the two pairs are so arranged that those of one pair are at one side of the fuse contacts and those of the other pair are near the bottom of the base and below the fuse contacts.

It will be observed that when a by-pass link such as G is held by the holding devices 73 and 71 a by-pass is provided around the switch contacts, thus directly connecting the meter with a service wire. It will also be observed that when a by-pass link such as B is held by the holding devices 59 and 60 there is provided a by-pass directly from the service wire to the corresponding load wire, thus maintaining the customer's current during testing.

For certain method of meter testing it is desirable to connect the two coils of the meter in series, and with the construction shown in Figs. 13 to 16 this may be easily accomplished. The screws carrying the two nuts 72 and 72ª are so spaced as to be adapted to receive a link J somewhat similar to the other links already described. As shown in Fig. 15 the holding devices at 72 and 72ª for the link J are directly connected respectively with the terminals 25 and 25ª, that is, with the terminals to which are connected the wires leading from the meter. As shown in Fig. 16 the holding devices 72 and 72ª are indirectly connected through the fuse contacts and the fuses with the terminals 24ª and 24, that is, with the terminals to which are connected the wires leading from the meter. It will be seen that the link J when in place, as shown either in Fig. 15 or in Fig. 16, provides a direct electrical connection between the two coils of the meter.

I have shown means serving to ensure the opening of the switch devices before putting the link J in place and to ensure the removal of the link before closing the switch devices. The said means as shown comprises a projection J′ on the link which extends through an opening 22′ in one of the switch members 22ᵃ. From an inspection of Figs. 15 and 16 it will be apparent that the extension J′ prevents the placement of the link J until the switch members are in their upper or "off" positions and that when the link is in place the extension J′ projects through the hole 22′ and prevents movement of the switch members to their "on" positions. If desired all of the links may be identical in form with the link J but this is not essential. In order to illustrate the fact that links C′ and H′, similar to J, may be used at all positions, I have indicated such links at the left side of Fig. 16.

It will be understood that various combinations of the by-pass links at the several positions may be selected and used at the option of the meter tester.

What I claim is:

1. In an electric meter service appliance, the combination of two pairs of opposed stationary switch contacts, supporting elements for the respective contacts forming therewith switch contact structures, a movable switching member comprising two conducting elements respectively movable between the said contacts of the corresponding pairs to make and break electrical connections between them, service wire and load wire connectible terminals connected respectively with the stationary switch contacts at one side of the switching member, two other wire terminals electrically connected respectively with the remaining stationary switch contacts at the other side of the switching member and adapted for the connection between them of a coil of an electric meter, and two additional contact devices carried respectively by the service and load connectible contact structures and electrically connected therewith, the said devices being adapted for the holding of a by-pass member to electrically connect the service and load terminals independently of the switch contacts and independently of the meter coil.

2. In an electric meter service appliance, the combination of a pair of fuse contacts, two pairs of opposed stationary switch contacts in normally fixed relation to the fuse contacts, supporting elements for the respective contacts forming therewith switch contact structures, a rectilinearly movable switching member comprising two conducting elements respectively movable between the switch contacts of the corresponding pairs to make and break electrical connections between them, service wire and load wire connectible terminals connected respectively with the stationary switch contacts at one side of the switching member, means electrically connecting one of the other switch contacts with one of the fuse contacts, two other wire terminals connected respectively with the remaining switch contact and the remaining fuse contact and adapted for the connection between them of a coil of an electric meter, and two additional contact devices carried respectively by the service and load connectible contact structures and electrically connected therewith, the said devices being adapted for the holding of a by-pass member to electrically connect the service and load terminals independently of the switch contacts and independently of the fuse contacts and the meter coil.

3. In an electric meter service appliance, the combination of an insulating base, a pair of fuse contacts on the base, an insulating supporting device, two supporting elements connected to the supporting device, at least one of the said elements being normally connected with the base for holding it in fixed spaced relation with the supporting device, two other supporting elements connected to the supporting device respectively adjacent the first said elements, two pairs of opposed stationary switch contacts carried by and electrically connected with the said supporting elements respectively, a rectilinearly movable switching member comprising two conducting elements adapted respectively to engage the switch contacts of the two pairs to make and break electrical connection between them, an electrical connection between one of the first said supporting elements and one of the fuse contacts, wire terminals connected respectively with the remaining fuse contact and with the remaining supporting element and adapted for the connection between them of a coil of an electric meter, service wire and load wire connectible terminals connected respectively with the second said supporting elements, and contact devices on the last said supporting elements for the holding of a by-pass link to provide a direct connection between the last said terminals.

4. In an electric meter service appliance, the combination of two pairs of opposed stationary switch contacts, a movable switching member comprising two conducting elements respectively movable between the said contacts of the corresponding pairs to make and break electrical connections between them, service wire and load wire connectible terminals connected respectively with the stationary switch contacts at one side of the switching member, two other wire terminals electrically connected respectively with the remaining stationary switch contacts at the other side of the switching member and adapted for the connection between them of a coil of an electric meter, and two clamping devices electrically connected with the first said terminals and adapted for the attachment of a detachable by-pass link to electrically connect the service and load terminals independently of the switch contacts and independently of the meter coil.

5. In an electric meter service appliance, the combination of a pair of fuse contacts, two pairs of opposed stationary switch contacts in normally fixed relation to the fuse contacts, supporting elements for the respective contacts forming therewith switch contact structures, a rectilinearly movable switching member comprising two conducting elements respectively movable between the switch contacts of the corresponding pairs to make and break electrical connections between them, service wire and load wire connectible terminals connected respectively with the switch contacts at one side of the switching member, means electrically connecting one of the other switch contacts with one of the fuse contacts, two other wire terminals connected respectively with the remaining switch contact and the remaining fuse contact and adapted for the connection between them of a coil of an electric meter, and two clamping devices carried respectively by and electrically connected with the said service and load connectible contact structures for the attachment of a detachable by-pass link to electrically connect the service and load terminals independently of the switch contacts and independently of the fuse contacts and the meter coil.

6. In an electric meter service appliance, the combination of two pairs of opposed stationary switch contacts, a movable switching member comprising two conducting elements respectively movable between the switch contacts of the corresponding pairs to make and break electrical connections between them, service wire and load wire connectible terminals connected respectively with a switch contact of one pair and with a switch contact of the other pair, conducting means interposed between the two remaining switch contacts, and two pairs of contact devices electrically connected respectively with the said two pairs of switch contacts and adapted for the holding of two separate by-pass members to electrically connect the said wire terminals independently of the switch contacts but through the interposed conducting means.

7. In an electric meter service appliance, the combination of a pair of fuse contacts, two pairs of opposed stationary switch contacts in normally fixed relation to the fuse contacts, a rectilinearly movable switching member comprising two conducting elements respectively movable between the switch contacts of the corresponding pairs to make and break electrical connections between them, service wire and load wire connectible terminals connected respectively with a switch contact of one pair and with a switch contact of the other pair, means electrically connecting the other switch contacts of the said pairs with the fuse contacts respectively, and two pairs of contacts devices located at opposite sides of the switching member and electrically connected respectively with the switch contacts of the two pairs, the said contact devices being carried by the switch contacts and adapted for the holding of two separate by-pass links to electrically connect the said wire terminals independently of the switch contacts but through the interposed fuse contacts.

8. In an electric meter service appliance, the combination of a pair of opposed stationary switch contacts, a rectilinearly movable switching member comprising a conducting element movable between the switch contacts to make and break electrical connections between them, a service wire connectible terminal connected with one stationary switch contact, another wire terminal electrically connected with the remaining switch contact and adapted for connection with a coil of an electric meter, and two contact devices electrically connected respectively with the said switch contacts and adapted for the holding of a link to electrically connect the service wire terminal with the meter coil terminal when the connection through the said switch contacts is broken, the said contact devices being located so that the engagement of the link therewith is prevented by the switching member in its circuit making position and so that the link when engaged prevents movement of the switching member to its circuit making position.

9. In an electric meter service appliance, the combination of two pairs of opposed stationary switch contacts, a rectilinearly movable switching member comprising two conducting elements movable between the switch contacts of the corresponding pairs to make and break electrical connections between them, service wire and load wire connectible terminals one connected respectively with a switch contact of one pair and with a switch contact of the other pair, two other wire terminals connected respectively with the remaining switch contacts and adapted for the connection between them of a coil of an electric meter, and two contact devices electrically connected respectively with the switch contacts of the service connected pair and adapted for the holding of a link to electrically connect the meter coil terminal with the service wire terminal when the connection through both pairs of the said switch contacts is broken, the said contact devices being located so that the engagement of the link therewith is prevented by the switching member in its circuit making position and so that the link when engaged prevents movement of the switching member to its circuit making position.

10. In an electric meter service appliance, the combination of two pairs of opposed stationary switch contacts, supporting elements for the respective contacts forming therewith switch contact structures, a movable switching member comprising two conducting elements respectively movable between the said contacts of the corresponding pairs to make and break electrical connections between them, service wire and load wire connectible terminals connected respectively with the stationary switch contacts at one side of the switching member, two other wire terminals electrically connected respectively with the remaining stationary switch contacts at the other side of the switching member and adapted for the connection between them of a coil of an electric meter, two attachment devices respectively carried by and electrically connected with the service and load connectible contact structures and serving for the attachment of a by-pass link to provide a direct electrical connection between the service and load terminals, and an insulating strut carried by and mechanically connecting the said by-pass attachment devices.

11. In an electric meter service appliance, the combination of an insulating base, a pair of fuse contacts on the base, an insulating supporting device, two supporting elements both connected to the supporting device and one mechanically connected to the base and electrically connected with one of the fuse contacts, two other supporting elements connected to the supporting device respectively adjacent the first said elements, two pairs of opposed stationary switch contacts carried by and electrically connected with the said supporting elements respectively, a rectilinearly movable switching member comprising two conducting elements adapted respectively to engage the switch contacts of the two pairs to make and break electrical connection between them, two wire terminals connected respectively with the remaining fuse contact and with the remaining one of the first said supporting elements and adapted for the connection between them of a coil of an electric meter, service wire and load wire connectible terminals connected respectively with two second said supporting elements, contact devices on the last said supporting elements for the holding of a by-pass link to provide a direct electrical connection between the last said terminals, and an insulating strut between the last said contact devices for holding them in fixed spaced relation.

12. In an electric meter service appliance, the combination of an insulating base, a pair of fuse contacts on the base, an insulating supporting device comprising two horizontal insulating bars spaced from each other, two supporting elements both connected to the respective bars and one mechanically connected to the base and electrically connected with one of the fuse contacts, two other supporting elements connected to the respective bars adjacent the first said elements, two pairs of opposed stationary switch contacts carried by and electrically connected with the said supporting elements respectively, a rectilinearly movable switching member comprising two conducting elements adapted respectively to engage the switch contacts of the two pairs to make and break electrical connection between them, two wire terminals connected respectively with the remaining fuse contact and with the remaining one of the first said supporting elements and adapted for the connection between them of a coil of an electric meter, service wire and load wire connectible terminals connected respectively with the second said supporting elements, contact devices on the last said supporting elements for the holding of a by-pass link to provide a direct electrical connection between the last said terminals, and an insulating strut connection between the last said contact devices and serving independently of the base for holding the two bars and the parts attached thereto in fixed relationship to each other.

13. In an electric meter service appliance, the combination of an insulating base, a pair of fuse contacts on the base, an insulating supporting device, two supporting elements both connected to the supporting device and one mechanically connected to the base and electrically connected with one of the fuse contacts, two other supporting elements connected to the supporting devices respectively adjacent the first said elements, two pairs of opposed stationary switch contacts carried by and electrically connected with the said supporting elements respectively, a rectilinearly movable switching member comprising two conducting elements adapted to respectively to engage the switch contacts of the two pairs to make and break electrical connection between them, a conducting strap on the base connected with the remaining fuse contact, two wire terminals connected respectively with the said strap and with the remaining one of the first said supporting elements and adapted for the connection between them of a coil of an electric meter, service wire and load wire connectible terminals connected respectively with the second said supporting elements, an insulating element carried by and connecting the last said two supporting elements, and means for connecting the said strap with the said insulating element to assist in holding the base in fixed spaced relation with the supporting device.

14. In an electric meter service appliance, the combination of an insulating base, a pair of fuse contacts on the base, an insulating supporting device, two supporting elements both connected to the supporting device and one mechanically connected to the base and electrically connected with one of the fuse contacts, two other supporting elements connected to the supporting device respectively adjacent the first said elements, two pairs of opposed stationary switch contacts carried by and electrically connected with the said supporting elements respectively, a rectilinearly movable switching member comprising two conducting elements adapted respectively to engage the switch contacts of the two pairs to make and break electrical connection between them, a conducting strap on the base connected with the remaining fuse contact, two wire terminals connected respectively with the said strap and with the remaining one of the first said supporting elements and adapted for the connection between them of a coil of an electric meter, service wire and load wire connectible terminals connected respectively with the second said supporting elements, contact devices on the last said supporting elements for the holding of a by-pass link to provide a direct electrical connection between the last said terminals, an insulating element carried by and connecting the last said two supporting elements, and means for connecting the said strap with the said insulating element to assist in holding the base in fixed spaced relation with the supporting device.

15. In an electric meter service appliance, the combination of a supporting device, an insulating base, a pair of fuse contacts on the base, two pairs of opposed stationary switch contacts carried by the supporting device independently of the base, a movable switching member comprising two conducting elements adapted respectively to engage the switch contacts of the two pairs to make and break electrical connection between them, means for detachably mounting the base on the said supporting device in normally fixed spaced relation thereto, the said means also serving to provide an electrical connection between one fuse contact and a stationary switch contact of one pair, two wire terminals one connectible with the remaining fuse contact and the other connected with a stationary switch contact of the other pair, the said terminals being adapted for the connection between them of a coil of an electric meter, service wire and load wire connectible terminals connected respectively with the remaining switch contacts of the said pairs, means independent of the base for supporting all of the said terminals, and means for detachably connecting the last said fuse contact with its terminal to permit the removal of the base independently of the said terminal.

16. In an electric meter service appliance, the combination of a supporting device, an insulating base, two pairs of fuse contacts on the base, four pairs of opposed stationary switch contacts carried by the supporting device independently of the base, two movable switching members each comprising two spaced conducting elements adapted respectively to engage the switch contacts of the two corresponding pairs to make and break electrical connection between them, means for detachably mounting the base in either of two relatively reversed positions with respect to the said supporting device and in normally fixed spaced relation thereto, the said means also serving in each position of the base to provide at each side an electrical connection between one fuse contact and a stationary switch contact of one pair, two wire terminals at each side one connectible with the remaining fuse contact and the other connected with a switch contact of the other pair, the said terminals being adapted for the connection between them of a coil of an electric meter, service wire and load wire connectible terminals at each side connected respectively with the remaining switch contacts of the said pairs, means independent of the base for supporting all of the said terminals, and means for detachably connecting the last said fuse contacts with their respective terminals to permit the reversal of the base independently of the said terminals.

17. In an electric meter service appliance, the combination of an insulating base, a pair of fuse contacts on the base, an insulating supporting device, two supporting elements connected to the supporting device, means for detachably connecting the base with one of the said elements to hold it in fixed spaced relation with the supporting device, the said means also serving to provide an electric connection between the said supporting element and one of the fuse contacts, two other supporting elements connected to the supporting device respectively adjacent the first said elements, two pairs of stationary switch contacts carried by and electrically connected with the said supporting elements respectively, a rectilinearly movable switching member comprising two conducting elements adapted respectively to engage the switch contacts of the two pairs to make and break electrical connection between them, service wire and load wire connectible terminals connected respectively with the second said supporting elements, two other wire terminals one connected with the remaining one of the first said supporting elements and the other connectible with the remaining fuse contact, the said terminals being adapted for the connection between them of a coil of an electric meter, contact devices on the second said supporting elements for the holding of a by-pass link to provide a direct electrical connection between service wire and load wire terminals, an insulating strut between the said contact devices, means for mounting said fuse contact connectible terminal on the said strut between the ends thereof and independently of the base, and means for detachably connecting the last said fuse contact with its terminal on the said strut.

18. In an electric meter service appliance, the combination of two pairs of opposed stationary switch contacts, a rectilinearly movable switching member comprising two conducting elements movable between the switch contacts of the corresponding pairs to make and break electrical connections between them, service wire and load wire connectible terminals one connected respectively with a switch contact of one pair and with a switch contact of the other pair, two other wire terminals connected respectively with the remaining switch contacts and adapted for the connection between them of a coil of an electric meter, and two contact devices electrically connected respectively with the switch contacts of the service connected pair and adapted for the holding of a link to electrically connect the meter coil terminal with the service wire terminal when the connection through both pairs of the said switch contacts is broken.

19. In an electric meter service appliance, the combination of two pairs of stationary electric contacts, those of one pair being switch contacts and those of the other pair being fuse contacts, a manually operable switch element movable to make and break electrical connection between the switch contacts, wire terminals whereby the contacts of one pair may be connected respectively with a service wire and a meter wire and whereby the contacts of the other pair may be connected respectively with a meter wire and a load wire, a pair of link holding devices electrically connected respectively with the service wire and load wire connectible terminals, and a second pair of link holding devices electrically connected respectively with one of the said service and load wire connectible terminals and with one of the said meter wire connectible terminals, the link holding devices of each pair being adapted for holding a rigid by-pass link and the devices of the two pairs being similarly constructed and substantially uniformly spaced so that they may interchangeably hold by-pass links of identical construction and size.

20. In an electric meter service appliance, the combination of two pairs of spaced electrical contacts, a conducting switching element movable to make and break electrical connection between the contacts of one pair, a movable connector adapted to connect the contacts of the other pair, a pair of wire terminals electrically connected respectively with the contacts of the first pair and adapted respectively for the connection of a service wire and of a wire leading to the meter, a pair of wire terminals normally electrically connected respectively with the contacts of the second pair and adapted respectively for the connection of a wire leading from the meter and of a load wire, and two pairs of link holding devices having one device of each pair electrically connected with the service wire connectible terminal and having the other devices of the said pairs electrically connected respectively with the first meter wire connectible terminal and with the load wire connectible terminal, the link holding devices of each pair being adapted for holding a rigid by-pass link and the devices of the two pairs being similarly constructed and substantially uniformly spaced so that they may interchangeably hold by-pass links of identical construction and size.

21. In an electric meter service appliance, the combination of an insulating base, a pair of fuse contacts on the base, a pair of stationary switch contacts associated with the base, a manually operable switching element movable to make and break electrical connection between the switch contacts, a pair of wire terminals electrically connected respectively with the switch contacts of the second pair and adapted respectively for the connection of a service wire and of a wire leading to the meter, a pair of wire terminals normally electrically connected respectively with the fuse contacts and adapted respectively for the connection of a wire leading from the meter and of a load wire, and two pairs of screw threaded link holding devices having one device of each pair electrically connected with the service wire connectible terminal and having the other devices of the said pairs electrically connected respectively with the first meter wire connectible terminal and with the load wire connectible terminal, the link holding devices of each pair being adapted for holding a rigid by-pass link having two spaced openings therein and the devices of the two pairs being similarly constructed and substantially uniformly spaced so that they may interchangeably hold by-pass links of identical construction and size.

22. In an electric meter service appliance, the combination of an insulating base, means for supporting the base in fixed relation to a rear supporting wall, a pair of fuse contacts on the base, a pair of stationary switch contacts adjacent the rear of the base, a conducting switching element at the rear of the base movable to make and break electrical connection between the switch contacts, a pair of wire terminals electrically connected respectively with the switch contacts and adapted respectively for the connection of a service wire and of a wire leading to the meter, a pair of wire terminals normally electrically connected respectively with the fuse contacts and adapted respectively for the connection of a wire leading from the meter and of a load wire, and two pairs of link holding devices accessible from the front and having one device of each pair electrically connected with the service wire connectible terminal and having the other devices of the said pairs electrically connected respectively with the first meter wire connectible terminal and with the load wire connectible terminal, the link holding devices of each pair being adapted for holding a rigid by-pass link and the devices of the two pairs being similarly constructed and substantially uniformly spaced so that they may interchangeably hold by-pass links of identical construction and size.

23. An electric meter service appliance as set forth in claim 22, wherein the link holding devices of one pair are at one side of the fuse contacts and wherein the link holding devices of the other pair are below the fuse contacts.

24. In a electric meter service appliance, the combination of an insulating base, means for supporting the base in fixed relation to a rear supporting wall, a pair of fuse contacts on the base, a pair of opposed stationary switch contacts adjacent the rear of the base and having their faces perpendicular to the rear face of the base, a switching member movable rectilinearly between the base and the supporting wall and comprising a conducting element movable between the switch contacts to make and break electrical connection between them, a pair of wire terminals electrically connected respectively with the switch contacts and adapted respectively for the connection of a service wire and of a wire leading to the meter, a pair of wire terminals normally electrically connected respectively with the fuse contacts and adapted respectively for the connection of a wire leading from the meter and of a load wire, and two pairs of link holding devices accessible from the front and having one device of each pair electrically connected with the service wire connectible terminal and having the other devices of the said pairs electrically connected respectively with the first meter wire connectible terminal and with the load wire connectible terminal, the link holding devices of each pair being adapted for holding a rigid by-pass link and the devices of the two pairs being similarly constructed and spaced so that they may interchangeably hold by-pass links of identical construction and size.

25. In a electric meter service appliance, the combination of two pairs of stationary electric contacts, those of one pair being switch contacts and those of the other pair being fuse contacts, a manually operable switch element movable to make and break electrical connection between the switch contacts, wire terminals whereby the contacts of one pair may be connected respectively with a service wire and a meter wire and whereby the contacts of the other pair may be connected respectively with a meter wire and a load wire, at least one additional conductor and a wire terminal therefor adapted for connection with a meter wire, a pair of link holding devices electrically connected respectively with the service and load wire connectible terminals, and a second pair of link holding devices electrically connected respectively with one of the first said meter wire connectible terminals and with the said additional meter wire connectible terminal, the link holding devices of each pair being adapted for holding a rigid by-pass link and the devices of the two pairs being similarly constructed and substantially uniformly spaced so that they may interchangeably hold by-pass links of identical construction and size.

26. An electric meter service appliance as set forth in claim 20, wherein the described parts are duplicated for two legs of a circuit, and wherein there is an additional pair of link holding devices adapted for holding a rigid by-pass link and normally electrically connected respectively with the second said meter wire connectible terminals in the two legs.

27. An electric meter service appliance as set forth in claim 20, wherein the described parts are duplicated for two legs of a circuit, wherein there is an additional pair of link holding devices adapted for holding a rigid by-pass link and normally electrically connected respectively with the second said meter wire connectible terminals in the two legs, and wherein the link holding devices of the several pairs are all similarly constructed and so spaced they may interchangeably hold by-pass links of identical construction and size.

In testimony whereof I have hereunto set my hand this 28th day of November, 1931.

JOSEPH SACHS.